United States Patent [19]

Nass et al.

[11] Patent Number: 6,140,388
[45] Date of Patent: Oct. 31, 2000

[54] THERMOSETTING BINDER PREPARED WITH MONO(HYDROXYALKYL)UREA AND OXAZOLIDONE CROSSLINKING AGENTS

[75] Inventors: David R. Nass, Bridgewater, N.J.; Andrew J. Kielbania, Jr., Chalfont, Pa.; Sharon P. Lee, Metuchen; Steven P. Pauls, Sr., Old Bridge, both of N.J.

[73] Assignee: National Starch and Chemical Investment Holding Corporation, Wilmington, Del.

[21] Appl. No.: 09/197,804

[22] Filed: Nov. 23, 1998

Related U.S. Application Data

[63] Continuation-in-part of application No. 08/922,244, Sep. 2, 1997, Pat. No. 5,840,822.

[51] Int. Cl.$^7$ .............................. B22C 1/00; B22C 1/22; B22C 3/00; C09K 3/18
[52] U.S. Cl. ..................... 523/139; 523/149; 524/442; 428/143; 428/147; 428/149; 428/150; 428/932; 51/298; 51/307; 51/308; 51/309; 106/36; 188/199; 188/251 R
[58] Field of Search .................... 523/139, 149; 524/442; 428/143, 147, 149, 150, 932; 51/298, 307, 308, 309; 106/36; 188/199, 251 R

[56] References Cited

U.S. PATENT DOCUMENTS

| Re. 34,092 | 10/1992 | Henry | 523/143 |
|---|---|---|---|
| 5,169,880 | 12/1992 | Yoshida et al. | 523/145 |
| 5,189,079 | 2/1993 | Geoffrey et al. | 523/142 |
| 5,190,993 | 3/1993 | Iyer | 523/145 |
| 5,234,973 | 8/1993 | Iyer et al. | 523/145 |
| 5,238,976 | 8/1993 | Iyer | 523/145 |
| 5,354,788 | 10/1994 | Johnson et al. | 523/145 |
| 5,397,369 | 3/1995 | Ohishi | 51/295 |
| 5,451,446 | 9/1995 | Kincaid et al. | 428/143 |
| 5,455,287 | 10/1995 | Carpenter et al. | 523/143 |
| 5,516,859 | 5/1996 | Dunnavant et al. | 525/504 |
| 5,529,666 | 6/1996 | Yesnik | 162/136 |
| 5,551,961 | 9/1996 | Engen et al. | 51/298 |
| 5,567,743 | 10/1996 | Busby et al. | 523/143 |
| 5,591,239 | 1/1997 | Larson et al. | 51/294 |
| 5,602,192 | 2/1997 | Yoshida et al. | 523/145 |
| 5,612,393 | 3/1997 | Arakawa et al. | 523/145 |
| 5,639,804 | 6/1997 | Yesnik | 523/156 |
| 5,646,199 | 7/1997 | Yoshida et al. | 123/139 |
| 5,676,577 | 10/1997 | Lam et al. | 442/60 |
| 5,688,857 | 11/1997 | Chen et al. | 524/590 |
| 5,713,968 | 2/1998 | Fruitman et al. | 51/296 |
| 5,733,952 | 3/1998 | Geoffrey | 523/143 |
| 5,753,018 | 5/1998 | Lamport et al. | 106/36 |
| 5,840,822 | 11/1998 | Lee et al. | 528/44 |
| 5,858,549 | 1/1999 | Kielbania, Jr. et al. | 428/474.4 |

FOREIGN PATENT DOCUMENTS 0 469 785 A2   5/1992   European Pat. Off. .

OTHER PUBLICATIONS

H. S. Kim and J. S. Huh, "Role of ceramic fillers in the friction and wear behaviour of phenolics resin composites", *Journal of Materials Science Letters* 17 (1998) 501–502.

Gopal et al., "Tribological Study of Non–Asbestos Fiber Reinforced Phenolic Composites for Braking Applications", Mechanical Behavior I, 106–113.

*Primary Examiner*—Nathan M. Nutter
*Attorney, Agent, or Firm*—John D. Thallemer

[57] ABSTRACT

Abrasive articles comprising a cured thermosetting binder and abrasive grains. The binder is prepared with a polyfunctional molecule comprising at least two functional groups selected from the group consisting of carboxyl and anhydride, and a crosslinking agent which is selected from the group consisting of a mono(hydroxyalkyl)urea comprising a single urea group, a single hydroxyl group, and at least two carbon atoms disposed between the urea group and the hydroxyl group, and 2-oxazolidone. The abrasive articles comprise bonded, nonwoven or coated abrasive articles.

36 Claims, No Drawings

THERMOSETTING BINDER PREPARED WITH MONO(HYDROXYALKYL)UREA AND OXAZOLIDONE CROSSLINKING AGENTS

CROSS-REFERENCE TO RELATED APPLICATIONS

This application is a continuation-in-part of application Ser. No. 08/922,244 filed Sep. 2, 1997 and now U.S. Pat. No. 5,840,822.

FIELD OF THE INVENTION

The present invention relates to abrasive articles prepared with abrasive grains and a binder prepared with a mono(hydroxyalkyl)urea or oxazolidone crosslinking agent.

BACKGROUND OF THE INVENTION

Synthetic polymers are used in a wide variety of applications. In many applications, these synthetic polymers are crosslinked in order to achieve the required performance properties. For over 60 years, a large class of commercially important thermoset polymers have utilized formaldehyde-based crosslinking agents. Such crosslinking agents based on formaldehyde traditionally have provided an efficient and cost-effective means of curing a wide variety of materials. Examples of formaldehyde-based crosslinking agents include melamine-formaldehyde, urea-formaldehyde, phenol-formaldehyde and acrylamide-formaldehyde adducts. With growing toxicity and environmental concerns, there has been an ongoing search to replace formaldehyde-based crosslinking agents. However, these alternative crosslinkers have suffered from significant deficiencies including low or slow cure, requiring end uses to change their commercial high speed application equipment, emission of toxic components or volatile organic compounds other than formaldehyde.

A particularly attractive crosslinking reaction involves the esterification of a carboxylic acid functional polymer with a hydroxyl functional polymer. This is an attractive reaction since water is the only product of the crosslinking reaction. However, for polymeric systems, this reaction is difficult to conduct effectively since it is slow under conventional time and temperature conditions of cure. Raising the temperature to force this curing reaction results in unacceptable color development and/or degradation, with the emission of unwanted volatile organic compounds.

β-Hydroxyalkyl amide functionality was developed to facilitate the esterification crosslinking of carboxylic acid containing polymers. However, this technology still is deficient in crosslinking rate and crosslinking densities under conditions typically used for formaldehyde based crosslinking agents. In addition to the high temperature and long curing time requirements for crosslinking, the use of a catalyst is only marginally effective in accelerating the reaction of β-hydroxyl amides.

To address this unfilled need for a formaldehyde-free crosslinker, we have found unexpectedly that (hydroxyalkyl)urea derivatives result in facile and safe crosslinking of di- and/or poly-functionalized molecules and polymers, as described herein below.

SUMMARY OF THE INVENTION

The present invention provides an abrasive article comprising: a plurality of abrasive grains; and at least one binder for the abrasive grains, wherein said binder comprises a cured composition comprising a poly-functional molecule comprising at least two functional groups selected from the group consisting of carboxyl and anhydride, and a crosslinking agent which is selected from the group consisting of a mono(hydroxyalkyl)urea comprising a single urea group, a single hydroxyl group, and at least two carbon atoms disposed between the urea group and the hydroxyl group, and 2-oxazolidone, wherein the crosslinking agent is present in an amount effective to crosslink the poly-functional molecule.

The crosslinking agent is represented by Structure (I)

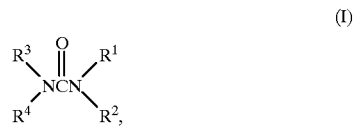

wherein

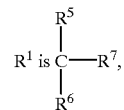

$R^2$ is H or $R^5$, $R^3$ is H or $R^5$, and $R^4$ is H, $R^1$, or $R^5$, wherein

$R^5$ is H, $CH_2OH$, $\overset{R^8}{\underset{|}{C}}\overset{R^9}{\underset{|}{H}}CHOH$, $\overset{R^8}{\underset{|}{C}}\overset{R^9}{\underset{|}{H}}\overset{R^{10}}{\underset{|}{C}}HCHOH$ or $C_1$–$C_4$ alkyl, $R^6$ is H, $CH_2OH$, CHCHOH, CHCHCHOH or $C_1$–$C_4$ alkyl, and $R^7$ is H, $CH_2OH$, CHCHOH, CHCHCHOH or $C_1$–$C_4$ alkyl, wherein $R^8$ is H, methyl or ethyl, $R^9$ is H, methyl or ethyl, and $R^{10}$ is H, methyl or ethyl.

In another embodiment, the invention provides a nonwoven abrasive article comprising a plurality of abrasive grains bonded into a nonwoven web by a binder, wherein said binder comprises the polyfunctional molecule and crosslinking agent.

In another embodiment, the invention provides a coated abrasive article comprising: (i) a substrate having a front side and a back side; (ii) at least one layer of abrasive grains bonded to said front side of said substrate by means of a make coat; (iii) optionally one or more additional coats selected from the group consisting of a size coat, a supersize coat, a saturant coat, a presize coat, and a backsize coat; wherein at least one of said make, size, supersize, saturant, presize, and backsize coats comprises a cured binder composition comprising the poly-functional molecule and crosslinking agent.

In another embodiment, the invention provides an open low-density abrasive article, comprising in combination: (a) a lofty, open, nonwoven three-dimensional fibrous web comprising a plurality of interentangled randomly-extending polyamide staple fibers including points of intersection and contact between said fibers, said points of intersection and contact between said fibers being bonded together to form a three-dimensionally integrated structure throughout said web; (b) a plurality of abrasive particles dispersed throughout said web and securely adhered to said surface of said fibers; and (c) a cured thermosetting binder composition dispersed throughout said web, said binder composition comprising the poly-functional molecule and crosslinking agent.

In another embodiment, the invention provides a casting core composition comprising: (a) refractory grains; and (b) at least one binder for the refractory grains, wherein said binder comprises the polyfunctional molecule and crosslinking agent.

In another embodiment, the invention provides a friction material comprising: (a) a porous fibrous base material formed from an aqueous paper slurry formulation having incorporated therein at least one silicone resin and at least one thermosetting resin, the silicone resin and thermosetting resin being dispersed throughout the fibrous base material such that the friction material exhibits high heat resistance and a substantially uniform coefficient of friction, wherein the thermosetting resin comprises a cured composition comprising the poly-functional molecule and crosslinking agent.

In another embodiment, the invention provides a composition for use in making foundry molds and cores comprising a mixture of: (a) an aggregate; and (b) an aqueous solution of a resin comprising the poly-functional molecule and crosslinking agent.

In another embodiment, the invention provides a grinding composition comprising: (i) a plurality of abrasive grains; and (ii) a resin comprising the poly-functional molecule and crosslinking agent, wherein said grinding composition is formed by mixing said abrasive grains, said resin, and a catalyst and molding and curing said grinding composition.

In another embodiment, the invention provides an abrasive stone pad comprising: (i) a dispersed silicon carbide compound formed by mixing a diluent, silicon carbide and a dispersing agent; and (ii) a resin comprising the poly-functional molecule and crosslinking agent, wherein said abrasive stone pad is formed by mixing said dispersed silicon carbide compound, said resin, and a catalyst and molding and curing said abrasive stone pad.

DESCRIPTION OF THE INVENTION

This invention relates to abrasive articles comprising a cured thermosetting binder and abrasive grains. The binder is prepared with a poly-functional molecule (PFM) comprising at least two functional groups selected from the group consisting of carboxyl and anhydride, and a crosslinking agent which is selected from the group consisting of a mono(hydroxyalkyl)urea comprising a single urea group, a single hydroxyl group, and at least two carbon atoms disposed between the urea group and the hydroxyl group, and 2-oxazolidone.

As used herein, the following terms are defined as:

"abrasive articles" means bonded abrasive articles, coated abrasive articles, and nonwoven abrasive articles;

"nonwoven" in reference to an open low density abrasion article means a web or batt of random or directional fibers held together through mechanical, chemical, or physical methods, or any combination of these, but excluding weaving, knitting, stitching, traditional felting, as well as conventionally formed paper;

"low density" in reference to a nonwoven web in an open low density abrasion article means an extremely open structure having an extremely high void volume;

"open" as used in reference to a nonwoven web in an open low density abrasion article means that web thickness of about one-fourth inch (6 mm) are highly translucent or transparent when held up to light;

As used herein, the term "molecule" means non-polymeric molecules, low molecular weight polymers or oligomers, for instance having molecular weight of less than about 10,000, and higher molecular weight polymers, for instance having molecular weight of greater than about 10,000 to greater than 1,000,000. The actual molecular weight of the molecule is not a limiting factor with respect to the use of the crosslinking agents.

The PFM must contain at least two functional groups selected from the group consisting of carboxyl and anhydride. Exemplary molecules which may be used in the present invention include without limitation citric acid, 1,2,4-benzene tricarboxylic acid, 1,2,4,5-benzene tetracarboxylic acid, 1,2,3,4-butane tetracarboxylic acid, poly (acrylic acid), carboxylic-acid-functionalized polyesters, carboxylic-acid-functionalized polyurethanes, and polymers prepared from monomers such as ethylene (E), vinyl acetate (VA), (meth)acrylic acid (M)AA, the $C_1$–$C_8$ alkyl esters of (meth)acrylic acid, maleic anhydride (MAnh), maleic acid, itaconic acid (IA), crotonic acid (CA), β-carboxy ethyl acrylate (BCEA), butadiene and styrene (STY). (Meth) acrylic is used herein to denote both acrylic and methacrylic acids and esters thereof. Exemplary copolymers include ethylene/vinyl acetate/acrylic acid copolymers, vinyl acetate/acrylic acid copolymers, acrylic acid/maleic anhydride copolymers, vinyl acetate/acrylic acid/maleic anhydride copolymers, ethylene/acrylic acid copolymers, ethylene/methacrylic acid copolymers, ethylene/vinyl acetate/acrylic acid/maleic anhydride copolymers, vinyl acetate/maleic anhydride copolymers, ethylene/vinyl acetate/maleic anhydride copolymers, methyl methacrylate/butyl acrylate/acrylic acid copolymers, methyl methacrylate/ethyl acrylate/acrylic acid copolymers, methyl methacrylate/butyl acrylate/itaconic acid copolymers, butyl acrylate/acrylic acid copolymers, butyl acrylate/BCEA copolymers, ethyl acrylate/acrylic acid copolymers, 2-ethylhexyl acrylate/acrylic acid copolymers, methyl methacrylate/ethyl (meth)acrylate/itaconic acid copolymers, styrene/(meth)acrylic acid copolymers, styrene/maleic anhydride copolymers, styrene/(meth)acrylic acid/maleic anhydride copolymers, styrene/itaconic acid copolymers and styrene/butadiene copolymers. Additionally, polymers comprising anhydride groups may be generated in situ during preparation of poly(acrylic acid). These examples are not limiting and the mono(hydroxyalkyl)urea or oxazolidone crosslinking agents according to the present invention may be used to crosslink virtually any molecule which comprises at least two functional groups selected from the group consisting of carboxyl, amine and anhydride. The mono(hydroxyalkyl)urea or oxazolidone crosslinking agent is very versatile and may be used easily to crosslink aqueous solution polymers, organic solution polymers, polymer melts, emulsion polymers, aqueous and non-aqueous dispersions of polymers, and powders.

The mono(hydroxyalkyl)urea or oxazolidone crosslinking agents of the present invention are derived from urea, comprise only a single urea group, a single hydroxyl group, and have at least two carbon atoms disposed between the urea group and the hydroxyl group. The crosslinking agent may include compounds represented by Structure (I). The two carbons disposed between the hydroxyl and urea groups may be in linear, branched or substituted configuration.

(I)

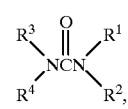

where

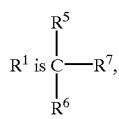

$R^2$ is H or $R^5$, $R^3$ is H or $R^5$, and $R^4$ is H, $R^1$, or $R^5$, where

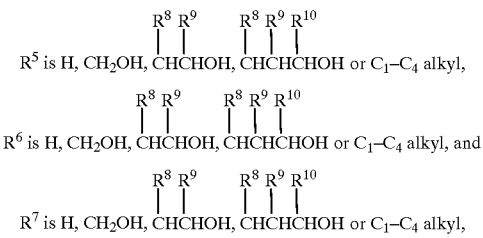

where $R^8$ is H, methyl or ethyl, $R^9$ is H, methyl or ethyl, and $R^{10}$ is H, methyl or ethyl.

Exemplary mono(hydroxyalkyl)urea crosslinkers include, without limitation, (2-hydroxyethyl)urea, (3-hydroxypropyl)urea, (4-hydroxybutyl)urea, 1,1-dimethyl-2-hydroxyethylurea, 1-ethyl-2-hydroxyethylurea, and (2-hydroxyethyl)ethyleneurea. The terms "crosslinking agent" and "crosslinker" are used interchangeably herein.

In certain embodiments of the invention, the PFM may be generated in situ from starting molecules which do not comprise at least two functional groups selected from the group consisting of carboxyl and anhydride. When the starting molecules and the mono(hydroxyalkyl)urea crosslinkers are combined under certain conditions effective to induce crosslinking, functional groups will be generated such that the molecules comprise at least two functional groups selected from the group consisting of carboxyl and anhydride. The functional groups may be generated in situ by the addition of heat to the system or by chemical reaction with the starting molecules. For example, acid catalyzed hydrolysis of alkyl esters such as methyl or t-butyl, are very facile in generating carboxylic acid. Other mechanisms of generating functional groups in situ will be readily apparent to those skilled in the art once having the benefit of the teachings contained herein.

The PFM and the mono(hydroxyalkyl)urea or oxazolidone crosslinking agent will be present in relative amounts such that the ratio of the sum total number of equivalents of the functional groups contained in the PFM to the number of equivalents of the hydroxyl groups contained in the crosslinker ranges from about 2:1 to about 100:1. Preferably, the ratio of the sum total number of equivalents of the functional groups contained in the PFM to the number of equivalents of the hydroxyl groups contained in the mono (hydroxyalkyl)urea crosslinker ranges from about 2:1 to about 10:1.

In certain embodiments of the present invention, Lewis acid and Lewis base catalysts may be used in combination with the crosslinking agent in order to further enhance crosslinking. Such catalysts generally include clays, silica, including without limitation colloidal silica, organic amines, quaternized-amines, metal oxides, metal sulfates, metal chlorides, urea sulfate, urea chloride and silicate-based catalysts. Exemplary catalysts which may be used in the invention are set forth in Table 3. Phosphorus-containing catalysts may be used in the present invention, including without limitation alkali metal hypophosphite salts, alkali metal phosphites, alkali metal polyphosphates, alkali metal dihydrogen phosphates, polyphosphoric acid and alkyl phosphinic acids. Such catalysts, when used, are used in less than stoichiometric amounts as the maximum level allowed, and in minimum amounts effective to improve crosslinking compared to a non-catalyzed, crosslinked composition. Each of the "catalyzed", crosslinked compositions of the invention exhibited significant increase in crosslinking when compared to a non-catalyzed, crosslinked composition of the invention, as evidence by the increase in insolubles noted in Table 3.

It is essential to note that the crosslinkable compositions according to the present invention do not require conventional crosslinking agents, such as epoxies or formaldehyde-containing crosslinking agents such as aminoplasts, nor do they require other reactive materials, for instance, isocyanate groups which would react with the hydroxyl groups, in order to provide articles of manufacture as disclosed herein. They preferably are free of such reactive materials which might interfere with the reaction of the hydroxyl groups of the mono(hydroxyalkyl)urea with the particular reactive group of the PFM. Accordingly, the crosslinkable systems of the present invention are essentially free of such epoxies, aminoplasts and isocyanate compounds, and even more preferably are free of such reactive species.

In methods of crosslinking the PFMs with the mono (hydroxyalkyl)urea crosslinkers, the crosslinker and PFM are combined under conditions effective to induce crosslinking of the PFM. Such conditions permit water to be removed from the system, thereby inducing crosslinking of the PFM. These conditions may be provided by adjusting temperature and/or pressure. For example, it is advantageous to cure the compositions at temperatures around 100° C., preferably greater than 100° C., in order to drive off water from the system. In fact, one of the advantages of the crosslinkers of the present invention is that they work particularly well in systems which must be cured at temperatures greater than 100° C. Curing may occur at pressures where water may be removed from the system, for example at low pressures or under vacuum. Both temperature and pressure be may be adjusted such that water may be removed from the system. Additionally, crosslinking may be induced by chemical reaction. For example, as noted herein above, under certain conditions PFMs may be generated in situ. Whether crosslinking be induced by heat transfer or by chemical reaction, the conditions must be effective to remove water from the system, thereby inducing crosslinking.

Compositions of the present invention may be used in preparing a number of compositions and articles of manufacture and may be applied to polymeric natural substrates, such as woven or non-woven cellulose, wood, leather, paper, cotton, wool, rayon and silk, and polymeric synthetic substrates, such as polyolefin, polyester, polyamide, polyvinyl chloride, polyvinylidene chloride and polyimide. Other substrates to which the compositions may be applied include glass, metal and composite substrates such as sand, ceramic, foundry sand and molds. The compositions may be used in preparing coatings, such as automotive coatings, powder coatings, adhesive coatings, inks and paints. The compositions also may be used as binders or sizing agents in the preparation of, for example, glass or cellulosic fibers, non-woven paper products, fiberglass insulation or batting, glass fiber rovings and molded fiberglass articles. The compositions also may be used as binders in woven and non-woven textiles and as backcoatings in carpets and other textiles. The compositions further may be used as saturants in the preparation of laminates, foams and mastics and as adhesives for the natural and synthetic substrates noted above.

The thermosetting binder compositions of the invention may optionally comprise additives that are commonly used in abrasive articles. Such additives include toughening agents, fillers, fibers, lubricants, grinding aids, wetting agents, surfactants, pigments, dyes, coupling agents, plasticizers, thermoplastics, such as polyetherimides, and suspending agents. Combinations of additives may also be used. A preferred additive is a toughening agent in an amount up to about 30 weight percent of the binder composition. An example of a toughening agent is an elastomeric polymer or elastomeric oligomer. Useful toughening agents also include carboxylated acrylonitrile/butadiene vulcanizable elastomers, isocyanate-functional polyethers, and functional acrylic rubbers including acrylic core/shell materials and core/shell polymers such as methacrylate-butadiene copolymers. The amount of additives is selected to yield an abrasive article having the desired abrasive properties.

It is preferred to add a filler and/or grinding aid to the binder composition. Fillers and grinding aids are typically inorganic particles having particle sizes ranging from about 1 to about 50 micrometers. The fillers can be selected from any filler material which does not adversely affect the characteristics of the cured binder. Examples of preferred fillers are calcium carbonate, silica, and calcium metasilicate. Examples of preferred grinding aids are cryolite, and potassium tetrafluoroborate.

During the manufacture of an abrasive article, the mono (hydroxyalkyl)urea or oxazolidone crosslinking agent and PFM are combined under conditions effective to induce crosslinking of the PFM. Such conditions permit water to be removed from the system, thereby inducing crosslinking of the PFM. These conditions may be provided by adjusting temperature and/or pressure. For example, it is advantageous to cure the compositions at temperatures around 100° C., preferably greater than 100° C., more preferably about 200° C., in order to drive off water from the system. In fact, one of the advantages of the crosslinkers of the present invention is that they are stable at elevated temperatures and therefore work particularly well in systems which must be cured at temperatures greater than 100° C. Curing may occur at pressures where water may be removed from the system, for example at low pressures or under vacuum. Both temperature and pressure be may be adjusted such that water may be removed from the system. Additionally, crosslinking may be induced by chemical reaction. For example, as noted herein above, under certain conditions PFMs may be generated in situ. Whether crosslinking be induced by heat transfer or by chemical reaction, the conditions must be effective to remove water from the system, thereby inducing crosslinking.

For coated abrasive articles and nonwoven abrasive articles, the curing temperature is limited to the temperature that the backing or the fibrous nonwoven substrate can withstand. For example, if the backing contains polyester fibers, the curing temperature will be limited to less than about 200° C.; likewise if the backing contains aramide fibers the curing temperature will be limited to about 300° C. For a metal backing, the curing temperature can be about 250° C. or greater. The rate of curing with any energy source varies with the nature of the composition. Typical curing conditions involve heating the binder compositions for about 1 minute to about 4 hours at about 150° C. to about 250° C.

In the manufacture of a coated abrasive product, the binder composition can be used as either a backsize coat, a saturant coat, a presize coat, a make coat, a size coat, a supersize coat, or combinations thereof. If the thermosetting binder composition of the invention is not employed in all of these coats, then a conventional binder can be employed. Examples of conventional binder resins include phenolic resins, urea-formaldehyde resins, melamine formaldehyde resins, latices, urethane resins, aminoplast resins, acrylate resins, epoxy resins, isocyanate resins, and mixtures thereof. The binder compositions can also be blended with such conventional resins.

In the manufacture of a nonwoven abrasive, the abrasive grains are first dispersed in a make coat precursor to form an abrasive slurry. The abrasive slurry is applied by spraying into an open porous lofty nonwoven substrate by any conventional coating technique. The make coat precursor is polymerized to form the make coat.

The binder of the invention can also be used in bonded abrasive products. The thermosetting binder serves to bond abrasive grains together to form a shaped mass. In one embodiment, the shaped mass is in the form of a grinding wheel. Bonded abrasive products are typically manufactured by a molding process, which process is well known to those skilled in the art.

In another embodiment of the invention, the abrasive article is an open low-density abrasive article, comprising in combination (a) a lofty, nonwoven three-dimensional fibrous web comprising a plurality of interentangled randomly-extending polyamide staple fibers including points of intersection and contact between said fibers, said points of intersection and contact between said fibers being bonded together to form a three-dimensionally integrated structure throughout said web, (b) a plurality of abrasive particles dispersed throughout said web and securely adhered to said surface of said fibers; and (c) a cured thermosetting binder composition dispersed throughout said web, said binder composition comprising a poly-functional molecule comprising at least two functional groups selected from the group consisting of carboxyl, anhydride and amine; and a crosslinking agent present in amounts effective to provide crosslinked compositions, said crosslinking agent comprising a single urea group and at least two hydroxyl groups, wherein at least two carbon atoms are disposed between the urea group and each of the hydroxyl groups.

The open low-density abrasive article may optionally contain a modifier comprising a rubber material in an amount effective to substantially prevent chemical degradation of said fibers. Preferably the rubber material is selected from acrylic rubber, natural rubber, polyisoprene and carboxy-modified nitrile rubber.

Such nonwoven abrasive articles may take any of a variety of conventional converted forms such as sheets, blocks, strips, belts, brushes, rotary flaps, discs, or solid or foamed wheels. Especially useful forms are discs, sheets and wheels. These forms are provided by assembling multiple layers of the nonwoven abrasive articles of the invention in a stacked or wound manner in multiple layer form and then consolidating the webs into a laminate useful in grinding, polishing, and finishing, such as used in conjunction with power-driven grinding equipment.

In another embodiment, the prebonded flat stock web is cut into round disc shapes, such as with a die, and the disc shapes are then make and size coated.

The nonwoven abrasive article also can be spirally wound about a core to provide the above-mentioned converted forms. Abrasive articles of larger dimension may be made by the preparation of multi-layer "slabs" or "buns". Uncured or partially cured layers of nonwoven abrasive sheet materials of the invention may be stacked, compressed and fully cured to make a layered composite structure capable of being converted into useful articles of substantial dimensions. Alternatively, ribbons, strips, or elongated segments of the nonwoven abrasive sheet may be spirally wound into a wheel shape while the binder is uncured or partially cured and thereafter fully cured to directly yield an abrasive wheel structure.

In another embodiment of the invention, the thermosetting binder of the invention is useful as a friction material such as an asbestos substitute. Suitable applications include drum linings, disc brake pads, brake shoes, clutch plates, transmission bands, synchronizer rings, friction disks, and brake blocks in drilling rigs. The binders of the invention when cured and combined with abrasive grains exhibit a high friction coefficient, excellent thermal stability, long lifetime, no noise, and reliable strength. Preferably, reinforcing fibers as well as friction and wear modifiers of organic, inorganic and metallic compounds are combined in the binder composition. Typical organic fillers include rubber powder and cashew dust which are used in regulating friction, reduction of brake noise and reliability improvement. Typical inorganic fillers are graphite, $MoS_2$, ferrite, $BaSO_4$, and $Ca(NH_4)_2$ are used in order to improve the lubrication and wear properties at high temperatures (>200° C.). Ceramic materials such as alumina, silica, or mullite are good for high friction coefficient and fade-resistant friction materials. Metallic fillers such as copper, aluminum, zinc and brass are also effective for high temperature wear materials.

The friction material contains a porous fibrous base material formed from an aqueous paper slurry formulation having incorporated therein at least one silicone resin and at least one thermosetting resin. The silicone resin and thermosetting resin being dispersed throughout the fibrous base material such that the friction material exhibits high heat resistance and a substantially uniform coefficient of friction. Various types of fibrous base raw pulp materials are useful such as cotton fibers, glass fibers, carbon fibers and/or aramid floc or fibers which are generally designated as aromatic polycarbonamide materials. It is noted that various paper formulations are useful in the present invention and that other materials can be present in the paper formulations. Useful silicone resins include polydimethylsiloxane such as ER-84002 available from Wacker. It is noted that other silicone resins can be used in the invention.

After the fibrous base material is formed into a friction material, the friction material is heated. The heating cures the thermosetting resin at a temperature of about 200° C. and cures the silicone resin at a temperature of about 400° F. Thereafter, the cured friction material is adhered to a desired substrate such as a clutch plate or brake shoe by suitable means.

In another embodiment, the resin of the invention is useful to bond an aggregate such as foundry sand to form a foundry core or mold as is known in the art, in order to provide easy shakeout. Generally, an aqueous solution of the resin comprising said poly-functional molecule and hydroxyalkylurea crosslinker is mixed with the aggregate.

In another embodiment, the resin of the invention provides an abrasive foam grinding, honing, and buffing material. The resin of the invention is combined with microballoons to produce an abrasive stone pad for use in processing workpiece surfaces such as computer hard disks.

The following nonlimiting examples illustrate further aspects of the invention.

EXAMPLE 1

Synthesis of Crosslinking Agent 61 g monoethanolamine and 60 g urea were charged in a 1 L flask equipped with heating mantle, thermometer and stirrer and allowed to react at 115° C. for 3 hours. A nitrogen purge was used to remove evolving ammonia. The progress of reaction was monitored by amine titration. A clear, hygroscopic liquid was obtained which contained a mixture of (2-hydroxyethyl)urea and 2-oxazolidone, which could be used as a crosslinker without purification.

In like manner, additional alkanolamines could be reacted in equimolar amounts with urea to obtain mono (hydroxyalkyl)urea crosslinkers, and include without limitation 3-aminopropanol, 4-aminobutanol, 2-amino-1-butanol, and 2-amino-2-methyl-1-propanol.

EXAMPLE 2

Synthesis of Crosslinking Agent 61 g of monoethanolamine in 100 g water was neutralized with concentrated hydrochloric acid. 81 g potassium cyanate was added and the mixture heated to 90° C. for 2 hours. After cooling to ambient temperature, potassium chloride was precipitated by addition of 200 ml of ethanol. The salt was filtered out and the final product was obtained upon removal of water and ethanol by rotary evaporation. The product was a hygroscopic liquid containing (2-hydroxyethyl)urea, which could be used as a crosslinker without further purification. The product similarly could be obtained using other acids to neutralize the amine, e.g. sulfuric acid, and using other cyanates, e.g., sodium cyanate.

EXAMPLE 3

Using the method of Example 1, the reaction was conducted effectively using refluxing water as a means of removing evolved ammonia. 61 g diethanolamine, 18 g water and 60 g urea were charged in a 1 L flask equipped with heating mantle, thermometer and stirrer and allowed to react at 115° C. for 3 hours.

EXAMPLE 4

Procedure for Determining Extent of Crosslinking by Measuring Percent Insoluble in Water 1. Combine polymer and crosslinker in specified amounts, based on equivalent weights.
2. Cast film in petri dish and dry overnight under ambient conditions.
3. Cut approximately 1 g piece of film and weigh accurately.
4. Put film in weighed aluminum tare and cure according to specified time/temperature schedule. (e.g., 200° C., 10 minutes). Weigh film again.
5. Fill jar with water. Cap jar and store overnight under ambient conditions.
6. Filter sample through weighed stainless 200 mesh screen.
7. Dry sample and screen to constant weight. Reweigh for final weight.
8. Calculate percent insoluble=dried sample weight/cured sample weight×100%.

Tables I, II, and III set forth crosslinking data for compositions of the present invention and for comparative compositions

TABLE I

Crosslinking of Poly(Acrylic Acid) Films

| Crosslinker Description | Crosslinker Synthesis | % Water Insoluble |
| --- | --- | --- |
| mono(2-hydroxyethyl)urea/2-oxazolidone mixture | Example 1 | 85 |
| 2-oxazolidone[1] | Aldrich | 72 |
| mono(2-hydroxyethyl)urea | Example 2 | 86 |
| (2-hydroxyethyl)-2-aminoethylurea | Example 1 | 67 |
| (2-hydroxyethyl)ethyleneurea[2] | Sartomer | 74 |
| None | | 0 |
| Ethylurea (control)[3] | Aldrich | 0 |

Polymer: poly(acrylic acid); 60,000 Mw
Cure: 200° C.; 10 minutes
Crosslinker level: 0.8:1 w/w crosslinker:poly(acrylic acid), on solids basis
% Insoluble: Overnight immersion in water at ambient conditions
[1]2-oxazolidone, 98% obtained from Aldrich Chemical Co.

TABLE I-continued

Crosslinking of Poly(Acrylic Acid) Films

| Crosslinker Description | Crosslinker Synthesis | % Water Insoluble |
|---|---|---|

[2] (2-hydroxyethyl)ethyleneurea (SR512) obtained from Sartomer Co.
[3] ethylurea, 97% obtained from Aldrich Chemical Co.

TABLE II

Crosslinking on Glass Substrate

| Crosslinker | % Pickup | Dry Tensiles (lb) CMD | Wet Gurley Stiffness (mgf) MD |
|---|---|---|---|
| None | 22 | 10.2 | 618 |
| mono(2-hydroxyethyl)urea/ oxazolidone mixture | 22 | 12.7 | 2497 |
| mono(2-hydroxyethyl)urea | 23 | 11.9 | 3075 |
| phenolic resin (control) | 20 | 12.2 | 2853 |

Polymer: 5,000 Mw poly(acrylic acid)
Cure: 200° C.; 10 minutes
Crosslinker level: 40 weight percent crosslinker versus poly(acrylic acid)
Substrate: Whatman GF/B Glass Fiber Filter Paper
Wet Stiffness: Cured specimen soaked one minute in 1% Triton X-100 solution, then reequilibrated to ambient temperature and humidity.

TABLE III

Catalyzed Crosslinking

| Catalyst | % Water Insoluble |
|---|---|
| none | 0 |
| sodium hypophosphite | 63 |
| Tyzor ™ LA[1] | 12 |
| Ludox ™ SK[2] | 13 |

Polymer: 60,000 Mw poly(acrylic acid)
Cure: 10 minutes, 150° C.
Crosslinker Level 0.7:1 w/w crosslinker:poly(acrylic acid) on solids basis
Crosslinker: mono(2-hydroxyethyl)urea
Catalyst Level: 0.08 mol equivalents per carboxyl
[1] Ammonium salt of lactic acid chelate of titanium available from E. I. duPont & Nemours.
[2] Colloidal silica available from E. I. duPont & Nemours.

EXAMPLE 5

Evaluation of acrylic acid/HEA copolymers. The test results are summarized in Table IV.

TABLE IV

Effects of Mono-HAU and Non-Crosslinked AA/HEA

| Crosslinker | Level (sos) | 10' Cure Temp. (deg F.) | PU (%) | BW (gsy) | Dry (lb) | CMD Tensiles Boiled (lb) | Hot (lb) | MD Wet Stiff (mgf) |
|---|---|---|---|---|---|---|---|---|
| None | — | 300 F. | 23% | 149 | 8.65 | 0.15 | 10.00 | 127 |
|  |  | 400 F. | 22% | 145 | 10.24 | 0.67 | 11.87 | 618 |
| Mono(2-hydroxy-ethyl)urea) | 43.2% | 300 F. | 23% | 144 | 9.42 | 0.14 | 13.32 | 171 |
|  |  | 400 F. | 22% | 140 | 12.72 | 7.35 | 14.39 | 2497 |

The test results in Table V show that the mono (hydroxyalkyl)urea crosslinking agents of the invention are effective to crosslink acrylic acid/hydroxyethyl acrylate copolymers.

EXAMPLE 6

Evaluation of PAA/mono-HAU with and without sodium hypophosphite catalyst. The test results are summarized in Tables V, VI, and VII. In the following tables, AR4 is a commercially available polyacrylic acid from Alco Chemical Company.

TABLE V

|  |  |  | 10 min @ 300 F. | | |
|---|---|---|---|---|---|
| Polymer | Crosslinker | Catalyst | PU | Dry | Boiled |
| AR4 | 43.0% mono-HAU | none | 20% | 13.2 | 0.3 |
| AR4 | 43.0% mono-HAU | 5% SHP | 20% | 14.3 | 1.0 |

TABLE VI

|  |  |  | 10 min @ 350 F. | | |
|---|---|---|---|---|---|
| Polymer | Crosslinker | Catalyst | PU | Dry | Boiled |
| AR4 | 43.0% mono-HAU | none | 20% | 12.4 | 3.2 |
| AR4 | 43.0% mono-HAU | 5% SHP | 20% | 13.9 | 3.1 |

TABLE VII

|  |  |  | 10 min @ 400 F. | | |
|---|---|---|---|---|---|
| Polymer | Crosslinker | Catalyst | PU | Dry | Boiled |
| AR4 | 43.0% mono-HAU | none | 20% | 12.3 | 8.2 |
| AR4 | 43.0% mono-HAU | 5% SHP | 20% | 13.6 | 8.6 |

EXAMPLE 7

Evaluation of tensile strength (wet soak is one minute in 1% Aerosol OT). The test results are summarized in Table VII.

TABLE VIII

| Polymer | PU | 10 min @ 150 F. | | 10 min @ 165 F. | | 10 min @ 180 F. | |
|---|---|---|---|---|---|---|---|
|  |  | Dry | Wet | Dry | Wet | Dry | Wet |
| 43.3% mono-HAU | 19% | 42.0 | 12.5 | 41.6 | 15.7 | 40.2 | 17.1 |
| 43.3% mono-HAU w/SHP | 20% | 35.6 | 12.8 | 37.0 | 16.9 | 35.4 | 18.1 |
| 21.6% mono-HAU | 19% | 40.9 | 11.3 | 40.2 | 14.5 | 40.5 | 15.8 |

TABLE VIII-continued

| Polymer | PU | 10 min @ 150 F. | | 10 min @ 165 F. | | 10 min @ 180 F. | |
| --- | --- | --- | --- | --- | --- | --- | --- |
| | | Dry | Wet | Dry | Wet | Dry | Wet |
| 21.6% mono-HAU w/SHP | 19% | 38.1 | 10.5 | 37.4 | 12.9 | 37.5 | 14.8 |

While the invention has been described with particular reference to certain embodiments thereof, it will be understood that changes and modifications may be made by those of ordinary skill in the art within the scope and spirit of the following claims.

What is claimed is:

1. An abrasive article comprising:

(a) a plurality of abrasive grains; and (b) at least one binder for the abrasive grains, wherein said binder comprises a cured composition comprising a poly-functional molecule comprising at least two functional groups selected from the group consisting of carboxyl and anhydride, and a crosslinking agent which is selected from the group consisting of a mono(hydroxyalkyl) urea comprising a single urea group, a single hydroxyl group, and at least two carbon atoms disposed between the urea group and the hydroxyl group, and 2-oxazolidone, wherein the crosslinking agent is present in an amount effective to crosslink the poly-functional molecule.

2. The abrasive article according to claim 1 wherein the ratio of the sum total number of equivalents of functional groups contained in the poly-functional molecule to the number of equivalents of hydroxyl groups contained in the crosslinking agent ranges from about 2:1 to about 100:1.

3. The abrasive article according to claim 1 wherein the ratio of the sum total number of equivalents of functional groups contained in the poly-functional molecule to the total number of equivalents of hydroxyl groups contained in the crosslinking agent ranges from about 2:1 to about 10:1.

4. The abrasive article according to claim 1 wherein the crosslinking agent is represented by Structure (I)

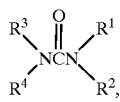

(I)

wherein

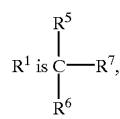

$R^2$ is H or $R^5$, $R^3$ is H or $R^5$, and $R^4$ is H, $R^1$, or $R^5$, wherein

$R^5$ is H, $CH_2OH$, CHCHOH, CHCHCHOH or $C_1$–$C_4$ alkyl,

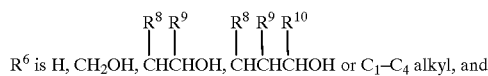

$R^6$ is H, $CH_2OH$, CHCHOH, CHCHCHOH or $C_1$–$C_4$ alkyl, and

-continued

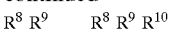

$R^7$ is H, $CH_2OH$, CHCHOH, CHCHCHOH or $C_1$–$C_4$ alkyl, wherein $R^8$ is H, methyl or ethyl, $R^9$ is H, methyl or ethyl, and $R^{10}$ is H, methyl or ethyl.

5. The abrasive article according to claim 1 wherein said mono(hydroxyalkyl)urea or oxazolidone crosslinking agent is selected from the group consisting of (2-hydroxyethyl) urea, (3-hydroxypropyl)urea, (4-hydroxybutyl)urea, 1,1-dimethyl-2-hydroxyethylurea, 1-ethyl-2-hydroxyethylurea, and (2-hydroxyethyl)ethyleneurea.

6. The abrasive article according to claim 1 wherein said binder composition further comprises a curing agent.

7. The abrasive article according to claim 6 wherein said curing agent is selected from the group consisting of Lewis acids, Lewis bases, and combinations thereof.

8. The abrasive article according to claim 7 wherein said catalyst is selected from the group consisting of alkali metal hypophosphite salts, alkali metal phosphites, alkali metal polyphosphates, alkali metal dihydrogen phosphates, polyphosphoric acid, and alkyl phosphinic acids.

9. The abrasive article according to claim 8 wherein said catalyst is sodium hypophosphite.

10. The abrasive article according to claim 1 wherein said binder composition further comprises an additive selected from the group consisting of fillers, grinding aids, toughening agents, and mixtures thereof.

11. The abrasive article according to claim 1 wherein said abrasive article comprises a coated abrasive article.

12. The abrasive article according to claim 11 wherein said coated abrasive article has a substrate comprising a backing comprising aramid fibers.

13. The abrasive article according to claim 1 wherein said abrasive article comprises a nonwoven abrasive article.

14. The abrasive article according to claim 1 wherein said abrasive article comprises a bonded abrasive article.

15. A nonwoven abrasive article comprising a plurality of abrasive grains bonded into a nonwoven web by a binder, wherein said binder comprises a cured composition comprising a poly-functional molecule comprising at least two functional groups selected from the group consisting of carboxyl and anhydride, and a crosslinking agent which is selected from the group consisting of a mono(hydroxyalkyl) urea comprising a single urea group, a single hydroxyl group, and at least two carbon atoms disposed between the urea group and the hydroxyl group, and 2-oxazolidone, wherein the crosslinking agent is present in an amount effective to crosslink the poly-functional molecule.

16. A bonded abrasive article comprising a plurality of abrasive grains bonded together by a binder to form a shaped mass, wherein said binder comprises a cured composition comprising a poly-functional molecule comprising at least two functional groups selected from the group consisting of carboxyl and anhydride, and a crosslinking agent which is selected from the group consisting of a mono(hydroxyalkyl) urea comprising a single urea group, a single hydroxyl group, and at least two carbon atoms disposed between the urea group and the hydroxyl group, and 2-oxazolidone, wherein the crosslinking agent is present in an amount effective to crosslink the poly-functional molecule.

17. A coated abrasive article comprising:

(i) a substrate having a front side and a back side;

(ii) at least one layer of abrasive grains bonded to said front side of said substrate by means of a make coat;

(iii) optionally one or more additional coats selected from the group consisting of a size coat, a supersize coat, a saturant coat, a presize coat, and a backsize coat;

wherein at least one of said make, size, supersize, saturant, presize, and backsize coats comprises a cured binder composition comprising:

a poly-functional molecule comprising at least two functional groups selected from the group consisting of carboxyl and anhydride, and a crosslinking agent which is selected from the group consisting of a mono(hydroxyalkyl)urea comprising a single urea group, a single hydroxyl group, and at least two carbon atoms disposed between the urea group and the hydroxyl group, and 2-oxazolidone, wherein the crosslinking agent is present in an amount effective to crosslink the poly-functional molecule.

18. The coated abrasive article according to claim 17 wherein the substrate is cloth.

19. An open low-density abrasive article, comprising in combination:

(a) a lofty, open, nonwoven three-dimensional fibrous web comprising a plurality of interentangled randomly-extending polyamide staple fibers including points of intersection and contact between said fibers, said points of intersection and contact between said fibers being bonded together to form a three-dimensionally integrated structure throughout said web;

(b) a plurality of abrasive particles dispersed throughout said web and securely adhered to said surface of said fibers; and (c) a cured thermosetting binder composition dispersed throughout said web, said binder composition comprising a poly-functional molecule comprising at least two functional groups selected from the group consisting of carboxyl and anhydride, and a crosslinking agent which is selected from the group consisting of a mono (hydroxyalkyl)urea comprising a single urea group, a single hydroxyl group, and at least two carbon atoms disposed between the urea group and the hydroxyl group, and 2-oxazolidone, wherein the crosslinking agent is present in an amount effective to crosslink the poly-functional molecule.

20. The open low-density abrasive article according to claim 19 wherein the binder composition further comprises a modifier comprising a rubber material in an amount effective to substantially prevent chemical degradation of said fibers, wherein said rubber material is selected from the group consisting of acrylic rubber, natural rubber, polyisoprene and carboxy-modified nitrile rubber.

21. A casting core composition comprising:

(a) refractory grains; and (b) at least one binder for the refractory grains, wherein said binder comprises a cured composition comprising a poly-functional molecule comprising at least two functional groups selected from the group consisting of carboxyl and anhydride, and a crosslinking agent which is selected from the group consisting of a mono(hydroxyalkyl) urea comprising a single urea group, a single hydroxyl group, and at least two carbon atoms disposed between the urea group and the hydroxyl group, and 2-oxazolidone, wherein the crosslinking agent is present in an amount effective to crosslink the poly-functional molecule.

22. A friction material comprising a base material and at least one binder, wherein said binder comprises a cured composition comprising a poly-functional molecule comprising at least two functional groups selected from the group consisting of carboxyl and anhydride, and a crosslinking agent which is selected from the group consisting of a mono(hydroxyalkyl)urea comprising a single urea group, a single hydroxyl group, and at least two carbon atoms disposed between the urea group and the hydroxyl group, and 2-oxazolidone, wherein the crosslinking agent is present in an amount effective to crosslink the poly-functional molecule.

23. The friction material according to claim 22 wherein the base material is selected from the group consisting of abrasive grains, reinforcing fibers, organic fillers, inorganic fillers, metallic compounds, and combinations thereof.

24. The friction material according to claim 23 wherein the organic fillers are selected from the group consisting of rubber powder and cashew dust.

25. The friction material according to claim 23 wherein the inorganic fillers are selected from the group consisting of graphite, $MoS_2$, ferrite, $BaSO_4$, and $Ca(NH_4)_2$.

26. A friction material comprising a porous fibrous base material formed from an aqueous paper slurry formulation having incorporated therein at least one silicone resin and at least one thermosetting resin, the silicone resin and thermosetting resin being dispersed throughout the fibrous base material such that the friction material exhibits high heat resistance and a substantially uniform coefficient of friction, wherein the thermosetting resin comprises a cured composition comprising a poly-functional molecule comprising at least two functional groups selected from the group consisting of carboxyl and anhydride, and a crosslinking agent which is selected from the group consisting of a mono (hydroxyalkyl)urea comprising a single urea group, a single hydroxyl group, and at least two carbon atoms disposed between the urea group and the hydroxyl group, and 2-oxazolidone, wherein the crosslinking agent is present in an amount effective to crosslink the poly-functional molecule.

27. The friction material according to claim 26 wherein the thermosetting resin is present in an amount of from about 3 to about 80 weight percent and the silicone resin is present in an amount of from about 25 to about 55 weight percent, in the fibrous base material, based on the weight of fibrous base material.

28. The friction material according to claim 26 wherein the fibrous base material further comprises about 2 to about 25 weight percent silicon nitride particles, based on the weight of the aqueous slurry formulation for the fibrous base material.

29. The friction material according to claim 26 wherein the porous fibrous base material further comprises about 3 to about 25 weight percent cashew nut shell liquid particles, based on the weight of the aqueous slurry formulation for the fibrous base material.

30. The friction material according to claim 26 wherein the porous fibrous base material comprises aramid pulp and/or fibers and cotton fibers.

31. A friction material according to claim 26 in the form of a clutch facing.

32. A friction material according to claim 26 in the form of a brake shoe lining.

33. A composition for use in making foundry molds and cores comprising a mixture of:

(a) an aggregate; and (b) an aqueous solution of a resin comprising a poly-functional molecule comprising at least two functional groups selected from the group consisting of carboxyl and anhydride, and a crosslinking agent which is selected from the group consisting of a mono (hydroxyalkyl)urea comprising a single urea group, a single hydroxyl group, and at least two carbon atoms disposed between the urea group and the hydroxyl group, and 2-oxazolidone, wherein the crosslinking agent is present in an amount effective to crosslink the poly-functional molecule.

34. A grinding composition comprising:
(i) a plurality of abrasive grains; and
(ii) a resin comprising a poly-functional molecule comprising at least two functional groups selected from the group consisting of carboxyl and anhydride, and a crosslinking agent which is selected from the group consisting of a mono(hydroxyalkyl)urea comprising a single urea group, a single hydroxyl group, and at least two carbon atoms disposed between the urea group and the hydroxyl group, and 2-oxazolidone, wherein the crosslinking agent is present in an amount effective to crosslink the poly-functional molecule, wherein said grinding composition is formed by mixing said abrasive grains, said resin, and a catalyst and molding and curing said grinding composition.

35. An abrasive stone pad comprising:
(i) a dispersed silicon carbide compound formed by mixing a diluent, silicon carbide and a dispersing agent; and
(ii) a resin comprising a poly-functional molecule comprising at least two functional groups selected from the group consisting of carboxyl and anhydride, and a crosslinking agent which is selected from the group consisting of a mono(hydroxyalkyl)urea comprising a single urea group, a single hydroxyl group, and at least two carbon atoms disposed between the urea group and the hydroxyl group, and 2-oxazolidone, wherein the crosslinking agent is present in an amount effective to crosslink the poly-functional molecule, wherein said abrasive stone pad is formed by mixing said dispersed silicon carbide compound, said resin, and a catalyst and molding and curing said abrasive stone pad.

36. The abrasive stone pad according to claim 35 wherein the diluent comprises water.

* * * * *